（12）United States Patent
Girod

(10) Patent No.: US 6,483,532 B1
(45) Date of Patent: Nov. 19, 2002

(54) VIDEO-ASSISTED AUDIO SIGNAL PROCESSING SYSTEM AND METHOD

(75) Inventor: Bernd Girod, Spardorf (DE)

(73) Assignee: Netergy Microelectronics, Inc., Santa Clara, CA (US)

( * ) Notice: Subject to any disclaimer, the term of this patent is extended or adjusted under 35 U.S.C. 154(b) by 0 days.

(21) Appl. No.: 09/114,668

(22) Filed: Jul. 13, 1998

(51) Int. Cl.⁷ .................................................. H04N 7/14
(52) U.S. Cl. ................ 348/14.12; 381/71.1; 381/71.12; 379/406.1; 379/406.08
(58) Field of Search ..... 348/14.12; 379/406.01–406.16, 379/100.17; 381/71.1, 71.11, 71.12, 71.13, 71.8

(56) References Cited

U.S. PATENT DOCUMENTS 5,387,943 A * 2/1995 Silver .......................... 348/512
5,621,858 A * 4/1997 Stork et al. ................. 395/2.41

* cited by examiner

Primary Examiner—Duc Nguyen
Assistant Examiner—Lun-See Lao

(57) ABSTRACT

A circuit arrangement for controlling audio signal transmissions for a communications system that includes a microphone and a video camera. The arrangement comprises a video processor configured and arranged to receive a video signal from the video camera, detect movement of an object in the video signal, and provide a motion-indicating signal indicating movement relative to the object. An audio processor is coupled to the video processor and is configured and arranged to modify the audio signal to be transmitted responsive to the motion-indicating signal. In another embodiment, a video signal processor is configured and arranged to receive a video signal from the video camera, detect mouth movement of a person and provide a mouth-movement signal indicative of movement of the person's mouth. An echo-cancellation circuit is coupled to the video signal processor and configured and arranged to filter from an audio signal provided by the microphone sound energy output by the speaker responsive to the mouth-movement signal.

18 Claims, 4 Drawing Sheets

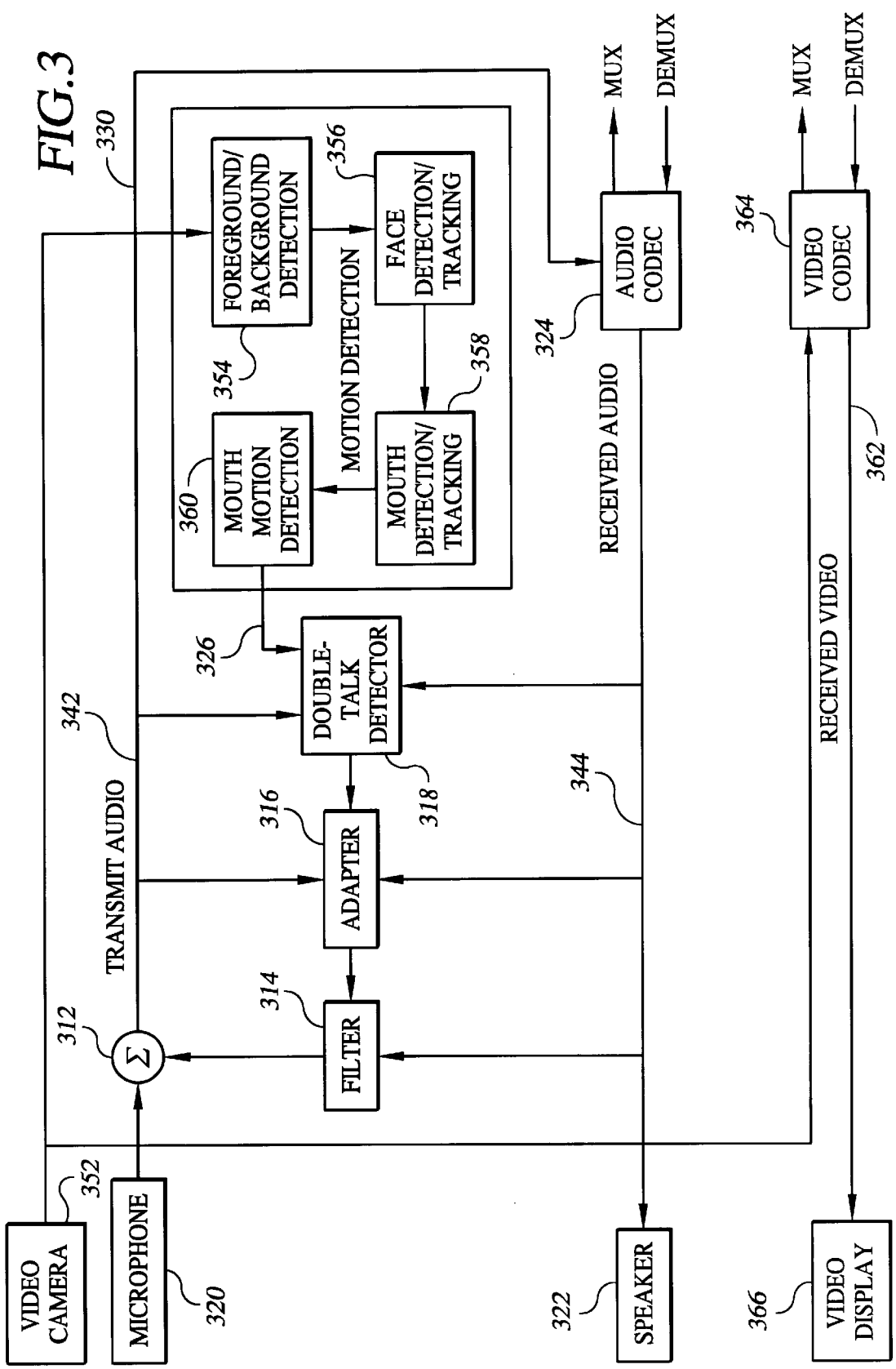

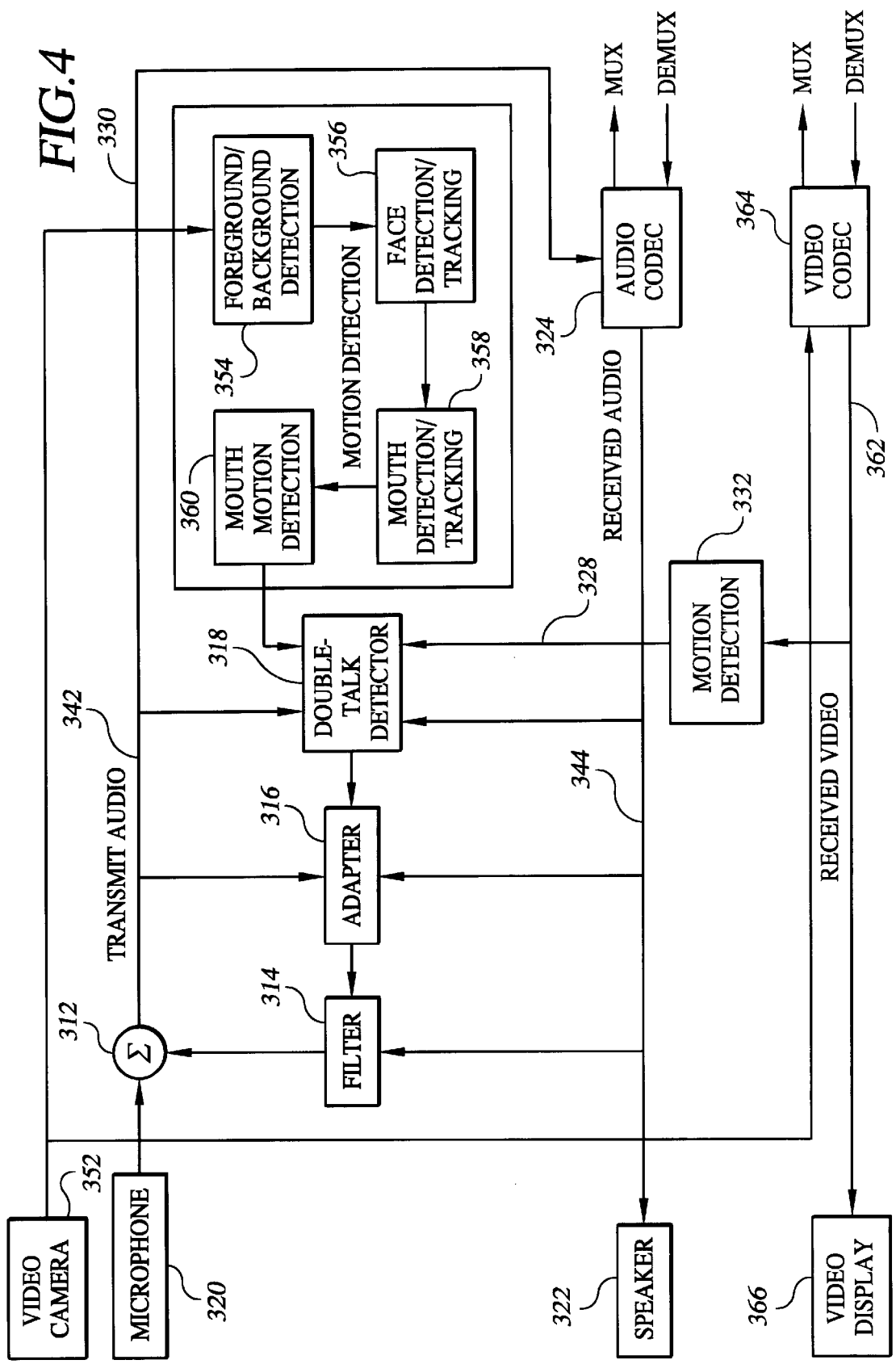

VIDEO-ASSISTED AUDIO SIGNAL PROCESSING SYSTEM AND METHOD

FIELD OF THE INVENTION

The present invention generally relates to audio signal processing, and more particularly to a video-assisted audio signal processing system and method.

BACKGROUND OF THE INVENTION

Videocommunicating arrangements generally include a camera for generating video signals, a microphone, sometimes integrated with the camera, a speaker for reproducing sound from a received audio signal, a video display for displaying a scene from a remote location, one or more processors for encoding and decoding video and audio, and a communication interface. In some instances the arrangement includes a speaker and microphone that are separate and not part of an integrated unit.

One problem that arises in videocommunicating applications, and with speakerphones as well, is the feedback of an audio signal from the speaker into the microphone. With this feedback of an audio signal, a participant hears an echo of his/her voice. Various methods are used to eliminate the echo in such arrangements. One approach to dealing with echo is operating in a half-duplex mode. In half-duplex mode, the arrangement is either transmitting or receiving an audio signal at any given time, but not both transmitting and receiving. Thus, only one person at a time is able to speak and be heard at both ends of the conversation. This may be undesirable because comments and/or utterances by a party may be lost, thereby causing confusion and wasting time.

Another approach for addressing the echo problem is an echo-cancellation circuit coupled to the microphone and speaker. With echo-cancellation, a received audio signal is modeled and thereafter subtracted from the audio generated by the microphone to cancel the echo. However, a problem with echo-cancellation is determining the proper time at which to model the received audio signal.

Therefore, it would be desirable to have a system that addresses the problems described above as well as other problems associated with videocommunicating.

SUMMARY OF THE INVENTION

The present invention is directed to a system and method for processing an audio signal in response to detected movement of an object in a video signal.

In one embodiment, a circuit arrangement is provided for controlling audio signal transmissions for a communications system that includes a microphone and a video camera. The arrangement comprises a video processor configured and arranged to receive a video signal from the video camera, detect movement of an object in the video signal, and provide a motion-indicating signal indicating movement relative to the object. An audio processor is coupled to the video processor and is configured and arranged to modify the audio signal to be transmitted responsive to the motion-indicating signal.

An echo-cancellation arrangement is provided in another embodiment. The echo-cancellation arrangement is for a video communication system that includes a microphone, a speaker, and a video camera for use by a video conference participant at a first location and comprises a video signal processor configured and arranged to receive a video signal from the video camera, detect mouth movement of the participant and provide a mouth-movement signal indicative of movement of the participant's mouth. An echo-cancellation circuit is coupled to the video signal processor and configured and arranged to filter from an audio signal provided by the microphone sound energy output by the speaker responsive to the mouth-movement signal.

A video communication arrangement with video-assisted echo-cancellation is provided in another embodiment. The arrangement is for use by a video conference participant at a first location and comprises a microphone, a speaker, and a video camera arranged to provide a video signal. A video signal processor is coupled to the video camera and is configured and arranged to detect mouth movement of the participant in the video signal and provide a mouth-movement signal indicative of the participant speaking. An echo-cancellation circuit is coupled to the microphone, speaker, and video signal processor and is configured and arranged to filter, responsive to the mouth-movement signal, from an audio signal provided by the microphone sound energy output by the speaker. A video display device is coupled to the processor. A multiplexer is coupled to a channel interface, the echo-cancellation circuit, and the video signal processor, and is configured and arranged to provide audio and video signals as output to the channel interface; and a demultiplexer is coupled to the channel interface, the echo-cancellation circuit, the video display device, and the speaker, and is configured and arranged to provide audio and video signals.

A method is provided for audio signal and video signal processing in accordance with another embodiment. The method comprises receiving a video signal from a video camera. An audio signal from a microphone is received, and movement of an object in the video signal is detected. A motion-indicating signal is provided to an audio signal processor when movement of the object is detected, and the audio signal is modified in response to the motion-indicating signal.

In another embodiment, a method is provided for audio signal and video signal processing. The method comprises receiving a video signal from a video camera. An audio signal is received from a microphone, and movement of a person's mouth in the video signal is detected. When movement is detected, a motion-indicating signal is provided to an echo-cancellation circuit, and filter coefficients are modified in response to the motion-indicating signal.

An apparatus for audio signal and video signal processing is provided in another embodiment. The apparatus comprises: means for receiving a video signal from a video camera; means for receiving an audio signal from a microphone; means for detecting movement of a person's mouth in the video signal; means for providing a motion-indicating signal to an echo-cancellation circuit when movement is detected; and means for modifying filter coefficients in response to the motion-indicating signal.

The above summary of the present invention is not intended to describe each illustrated embodiment or every implementation of the present invention. The figures and the detailed description which follow more particularly exemplify these embodiments.

BRIEF DESCRIPTION OF THE DRAWING

Other aspects and advantages of the present invention will become apparent upon reading the following detailed description and upon reference to the drawings in which:

FIG. 3 is a block diagram that shows an echo-cancellation circuit arrangement that is enhanced with video motion detection according to an example embodiment of the invention; and FIG. 4 is a block diagram that shows an echo-cancellation circuit arrangement that is enhanced with video motion detection relative to both a first and a second video source.

Figure 1:
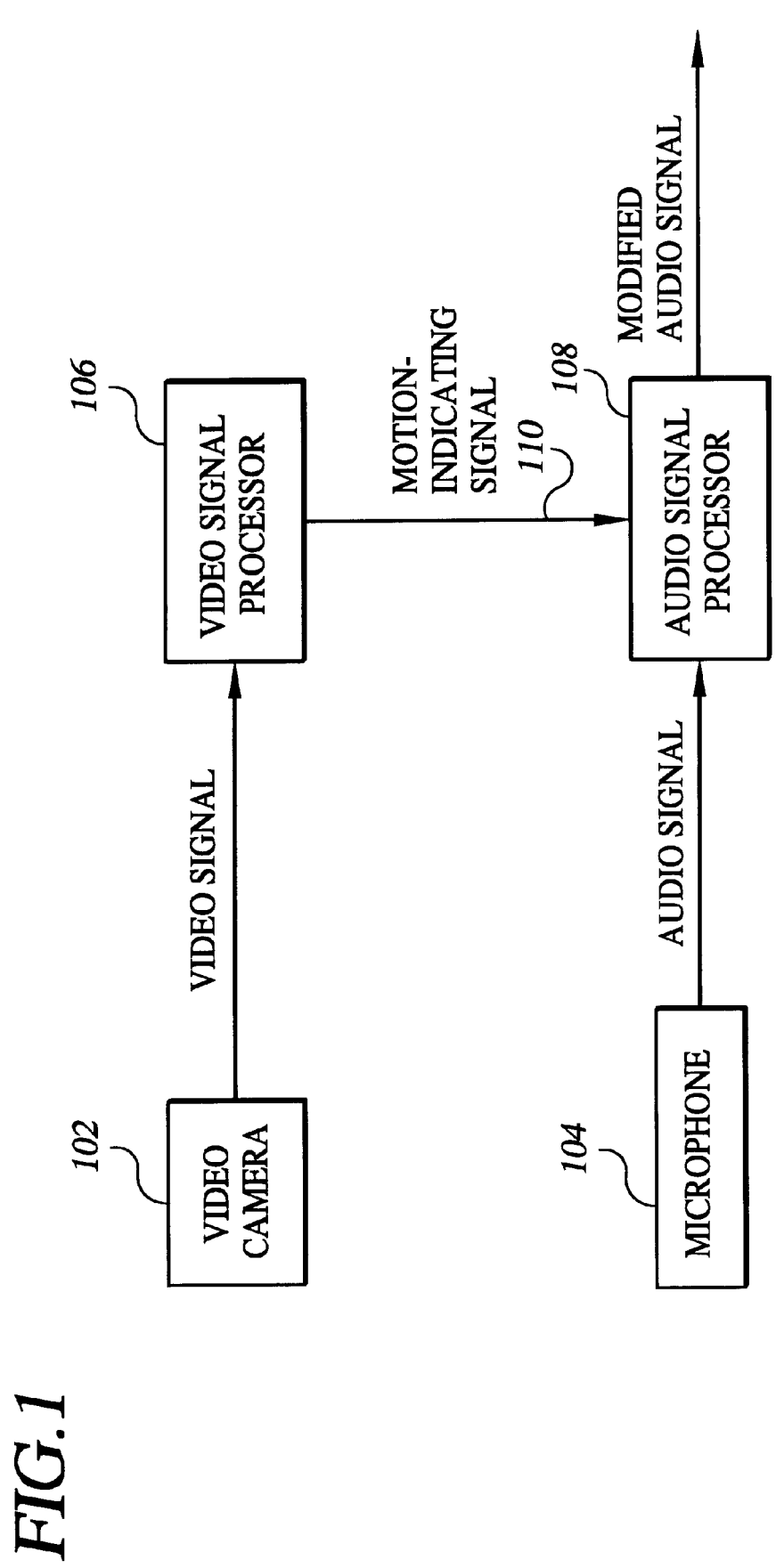
FIG. 1 is a block diagram illustrating an example system in accordance with the principles of the present invention.

While the invention is susceptible to various modifications in alternative forms, specific embodiments thereof have been shown by way of example in the drawings and will herein be described in detail. It should be understood, however, that the invention is not limited to the particular forms disclosed. On the contrary, the intent is to cover all modifications, equivalents, and alternatives falling within the spirit and scope of the invention was defined by the appended claims.

DETAILED DESCRIPTION

The present invention is believed to be applicable to various types of data processing environments in which an audio signal is processed for transmission. In an application such as videoconferencing, the present invention may be particularly advantageous as applied to echo-cancellation. While not so limited, an appreciation of the invention may be ascertained through a discussion in the context of a videoconferencing application. The figures are used to present such an application.

Turning now to the drawings, FIG. 1 is a block diagram illustrating a system according to an example embodiment of the present invention. In one aspect of the invention, a scene captured by a video camera 102 is analyzed for movement of a selected or a foreign object, for example. A selected object may be a person in a room, and a foreign object may be any object that is new to a scene, such as a person or automobile entering a scene that is under surveillance. In response to detected motion, an audio signal from a microphone 104 is modified in a predetermined manner. The manner in which the audio signal is modified is dependent upon the particular application. For an application such as videoconferencing, it can be inferred that detected motion, for example, of a person's mouth, indicates that the person is talking, and the audio signal for that person can be modified accordingly. In one example application, the absence of detected motion is used to control an echo-cancellation circuit arrangement. In another example application, an audio signal can be muted when there is no detected motion and not muted when motion is detected.

The example system of FIG. 1 includes a video camera 102, a microphone 104, a video signal processor 106, and an audio signal processor 108. The video signal processor 106 receives a video signal from video camera 102, and the audio signal processor 108 receives an audio signal from microphone 104. The audio signal received by audio signal processor 108 is modified in response to a motion-indicating signal received on line 110 from the video signal processor 106.

The video camera 102 and microphone 104 can be those of a conventional camcorder, for example. Alternatively, separate conventional components could be used for the video camera 102 and microphone 104. The video signal processor 106 and audio signal processor 108 can be implemented as separate processors, or their functionality can be combined into a single processor. For example, a suitable processor arrangement is described in U.S. Pat. Nos., 5,901, 248, and 5,790,712, respectively entitled and relating to issued patents entitled "Programmable Architecture and Methods for Motion Estimation" (U.S. Pat. No. 5,594,8813) and "Video Compression and Decompression Processing and Processors" (U.S. Pat. No. 5,379,351). These patents are incorporated herein by reference.

Figure 2:
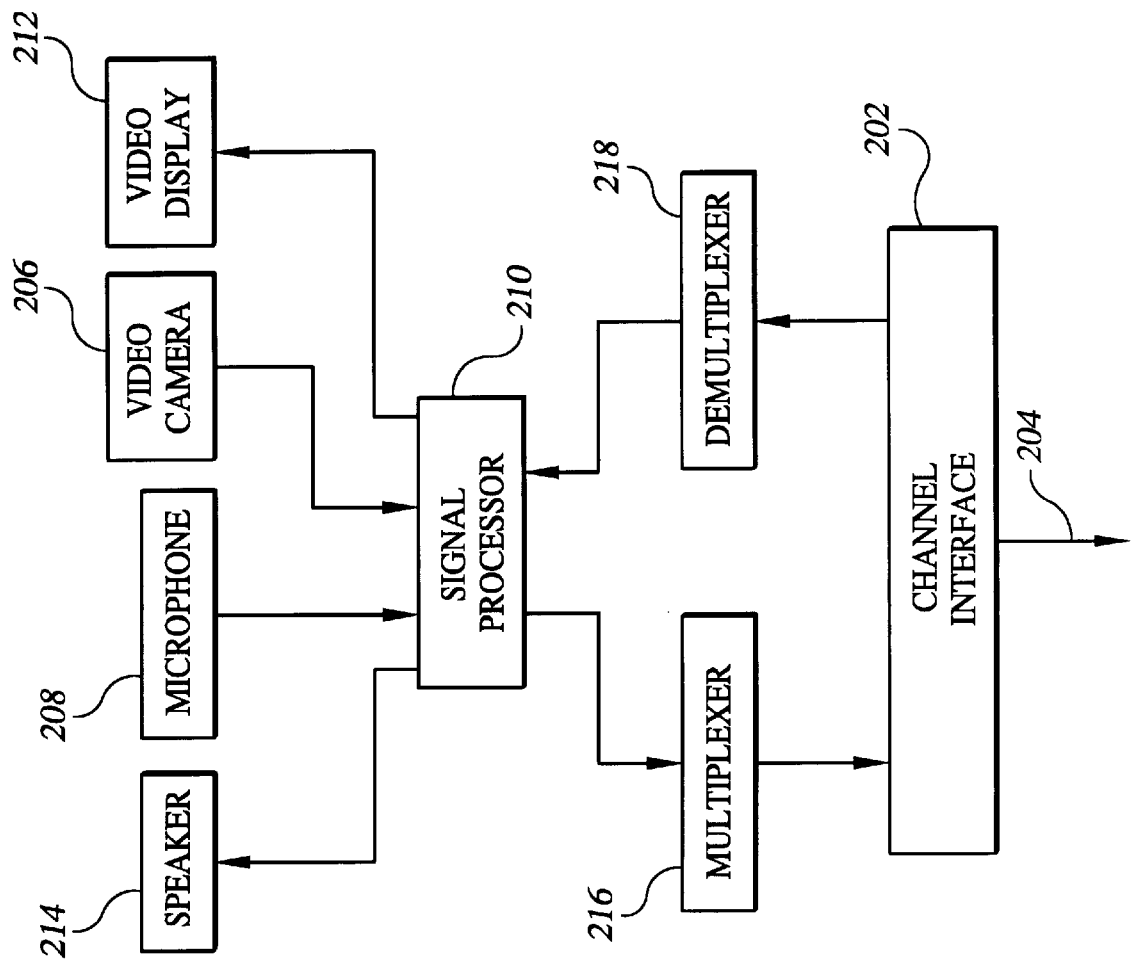
FIG. 2 is a block diagram of an example videoconferencing system in which the present invention can be used.

FIG. 2 is a block diagram of an example videoconferencing system in which the present invention can be used. A channel interface device 202 is used to send processed data over a communication channel 204 to a receiving channel interface (not shown), and also receive data over channel 204. The data that is presented to the channel interface device is collected from various sources including, for example, a video camera 206 and a microphone 208. In addition, data could be received from a user control device (not shown) and a personal computer (not shown). The data collected from each of these sources is processed, for example by signal processor 210, which can be implemented as described above. A video display 212 and a speaker 214 are used to output signals received by channel interface device 202, for example, videoconferencing signals from a remote site.

The signal processor 210 includes codec functions for processing audio and video signals according to, for example, the ITU-T H.263 standard for video and the ITU-T G.723 standard for audio. Data that is collected by the signal processor 210 and encoded is provided to a multiplexer 216. In an example embodiment, multiplexer 216 monitors the available channel 204 bandwidth and, based on the channel's capacity to transmit additional data, collects and formats the data collected from each of the input sources so as to maximize the amount of data to be transmitted over the channel. The demultiplexer 218 is arranged to sort out the formatted data received over channel 204 according to instructions previously sent by a remote terminal. The demultiplexed data is then presented to signal processor 210 for decoding and output on the appropriate device, for example, speaker 214 or video camera 206.

FIG. 3 is a block diagram that shows an echo-cancellation circuit arrangement that is enhanced with video motion detection according to an example embodiment of the invention. The echo-cancellation circuit arrangement includes a summing circuit 312, a filter 314, an adapter 316, and a double-talk detector 318. The echo-cancellation circuit arrangement is coupled to a microphone 320, a speaker 322, and an audio codec 324.

The summing circuit 312, filter 314, and adapter 316 can be conventionally constructed and arranged. The double-talk detector 318 is tailored to be responsive to input signals on line 326 from motion detection arrangement 330.

If the speaker 322 is too close to microphone 320, the transmit audio signal on line 342 will initially, before echo cancellation through summing circuit 312 is effective, include some of the sound from speaker 322. Thus, a person at another location, for example at another terminal coupled to the communication channel may hear words he spoke echoed back. One possible solution to solve the echo problem is half-duplex communication. However, a problem with half-duplex communication is that as between two persons on two terminals, only one person can speak at a time.

The echo-path, from the speaker 322 to the microphone 320, can be modeled as a time varying linear filter. The received audio signal on line 344 is passed through the filter 314, which is a replica of the "filter" formed by the echo-path, and then to cancel the echo, the filtered audio signal is subtracted from the audio signal generated by the microphone 320. Thus, the audio signal output from summing circuit 312 is that from sound generated from a local source, such as a person speaking into microphone 320.

An effective echo cancellation circuit requires that the coefficients used by the filter 314 are adapted accurately, reliably, and as rapidly as possible. The filter can be implemented as a digital finite impulse response (FIR) filter or a sub-band filter bank. The manner in which the filter coefficients are adapted is as follows: When there is only a received audio signal (on line 344) and no near-end speech (as captured by microphone 320), adapter 316 adjusts the filter coefficients so that the transmit audio signal on line 342 is completely canceled. In other words, because there is no near-end speech the only signal being canceled is that emitted by speaker 322. However, because it is expected that a person would be present, it is difficult to adjust the coefficients reliably because of interference of sound from the person. If adaptation of the filter coefficients is carried out in the presence of near-end speech, the result is often a divergence of the adaptation scheme from the correct, converged state and consequently a deterioration of the echo cancellation performance.

A key to effectively adjusting the filter coefficients is double-talk detector 318. The double-talk detector 318 is coupled to transmit audio signal line 342, to received audio signal line 344, and to adapter 316. Double-talk detector 318 signals adapter 316 when to improve or freeze the filter coefficients. More specifically, the double-talk detector 318 determines whether the strength of the received audio signal on line 344 is great enough and the transmit audio signal on line 342 is weak enough for adapter 316 to reliably adapt the filter coefficients.

Various approaches for adjusting the coefficients of filter 314 by means of adapter 316 and double talk detector 318 are generally known. Due to its simplicity, the normalized least mean square (NLMS) method is commonly used for coefficient adaptation. The NLMS algorithm adjusts all N coefficients $c[n]$, $n=0, \ldots, N-1$ of a finite-impulse-response filter 314 for each sample k of the transmit audio signal 342. If the samples of the received audio signal 344 are denoted by $x[k]$ and the transmit audio signal 342 is denoted by $y[k]$, and $x'[n]$ are the samples of the received audio signal 344, indexed relative to the current sampling position k, i.e., $$x'[n]=x[k-n], \text{ for } n=0, \ldots, N-1$$

Then, the coefficients $c[n]$, $n=0, \ldots, N-1$ of the finite-impulse-response filter 314 are improved accordingly under the rule $$c\_new[n]=c\_old[n]+ss*(x'[n]y[k])/\|x\|$$

where $\|x\|$ is the short-term energy of the received audio signal:

$$\|x\|=x'[0]x'[0]+x'[1]x'[1]+ \ldots +x'[n]x'[n]+ \ldots +x'[N-1]x'[N-1]$$

The parameter, ss, is the step-size of the adaptation. The coefficient improvement is repeated for each new sample, k, and $c\_new[n]$ takes on the role of $c\_old[n]$ in the next adaptation step. NLMS implementations often employ a fixed step-size, which is experimentally chosen as a compromise between fast adaptation and a small steady-state error. A small step-size provides a small adjustment error in the steady state and a higher robustness against interfering noise and near-end speech. On the other hand, a large step-size is desirable for faster convergence (initially, or when the room acoustics change) but it incurs the cost of a higher steady-state error and sensitivity against noise and near-end speech. A double-talk detector 318 therefore is desirable, because it provides detection of interfering near-end speech and sets the step-size ss=0 temporarily. If no interfering near-end speech is detected, a much larger non-zero step-size can be chosen, as would be the case without a double-talk detector. The double-talk detector can alternatively change the adaptation step-size ss gradually, rather then switching between zero and a fixed step-size. One such scheme for the NLMS algorithm is described by C. Antweiler, J. Grunwald, and H. Quack in "Approximation of Optimal Step Size Control for Acoustic Echo Cancellation," Proc. IEEE International Conference on Acoustics, Speech, and Signal Processing ICASSP'97, Munich, Germany, April 1997.

It will be appreciated that the double-talk detector 318 receives the transmit audio signal on line 342 after the echo has been canceled. This is because it is desirable to compare the received audio signal to the transmit audio signal without the echo. In the case where there is a strong coupling between the speaker 322 and microphone 320 it may be difficult to determine the proper time at which to adjust the filter coefficients. An example scenario is where the speaker is placed near the microphone, and the filter is not yet converged. If there is silence at the near-end, and a far-end audio signal is received (where "far-end" refers to signals received by codec 324), the conditions are proper to adapt the filter. However, the double-talk detector will erroneously detect a near-end signal because the far-end signal fed back to the microphone is not canceled by the echo-cancellation circuitry. When the speaker and microphone are placed near one another, the double-talk detector may never find that it is appropriate to adapt the coefficients, and therefore the coefficients will not converge to a useful state.

A simple implementation of a double-talk detector compares short-term energy levels of transmit audio signals on line 342 and received audio signals on line 344. For an example frame size of 30 milliseconds, the energy level for the frame is calculated and if the received audio energy exceeds a selected level and the transmit audio energy is below a selected level, the double-talk detector signals adapter 316 that it is in a receive-only mode and the coefficients can be adapted. If the coupling between the speaker 322 and the microphone 320 is strong enough, the conditions may never arise where the double-talk detector signals the adapter to adjust the filter coefficients, and the coefficients may never converge.

In the example embodiment of the invention described in FIG. 3, a first motion detection arrangement 330 is provided for assisting the echo-cancellation circuitry in determining when to adjust the filter coefficients. Generally, when a person's mouth is moving, the person is likely to be speaking, and it is not appropriate to adjust the filter coefficients. In contrast if the person's mouth is not moving, the person is probably not speaking and it may be an appropriate time to adjust the filter coefficients.

The first motion detection arrangement 330 is coupled to a video camera 352 that generates video signals from a person using the microphone 320 and speaker 322. The motion detection arrangement 330 includes sub-components foreground/background detection 354, face detection/tracking 356, mouth detection/tracking 358, and mouth motion detection. The foreground/background detection component 354 eliminates from an input video signal the parts of a scene that are still and keeps the parts that are in motion. For example, because a video camera 352 for a videoconference is generally static, the background is motionless while persons in view of the camera may exhibit head movement, however slight. Within the parts of the scene that are moving, the person's face is detected and tracked according to any one of generally known algorithms, such as, for example, detecting the part that corresponds to the color of a person's skin, or detecting the eyes and the nostrils. Once the face is detected, the mouth detection/tracking component 356 locates the mouth in the scene. Again color and shape parameters can be used to detect and track the mouth. Mouth motion detection component 360 tracks the movement of a mouth, for example, on a frame-to-frame basis. If the mouth is moving, then a corresponding motion energy signal is provided to double-talk detector 318 on line 326. It will be appreciated that the mouth detection/tracking component 358 and mouth motion detection component 360 together discern between mouth movement as a result of head movement and mouth movement as part of speaking. Each of components 354–358 can be implemented using generally known techniques and as one or more general or special purpose processors.

An example arrangement for detecting mouth motion and generating a motion energy signal is described in more detail in the following paragraphs. Several techniques are known in the art to detect and track the location of human faces in a video sequence. An overview of the various approaches is provided, for example, by R. Chellapa, C. L. Wilson, and S. Sirohey, in "Human and machine recognition of faces: A survey," Proc. of the IEEE, vol. 83, no. 5, May 1995, pp. 705–740. One technique, that is suitable for the invention, is described by H. Nugroho, S. Takahashi, Y. Ooi, and S. Ozawa, in "Detecting Human Face from Monocular Image Sequences by Genetic Algorithms," Proc. IEEE International Conference on Acoustics, Speech, and Signal Processing ICASSP-97, Munich, Germany, April 1997 (hereinafter the "Nugroho technique"). The Nugroho technique extracts the head of a moving person from an image by first applying nonlinear frame differencing to an edge map, thereby separating moving foreground from static background. Then, an ellipse template for the head outline is fitted to the edge map and templates for eyes and mouth are incorporated by an appropriate minimal cost function, thereby locating one or several faces in the scene. The templates exploit the fact that the mouth and eye areas are generally darker then the rest of the face. The cost minimization function is carried out using "genetic algorithms," but other known search procedures could be alternatively used.

An alternative embodiment of the invention uses a face detection technique described by R. Stiefelhagen and J. Yang, in "Gaze Tracking for Multimodal Human-Computer Interaction," Proc. IEEE International Conference on Acoustics, Speech, and Signal Processing ICASSP-97, Munich, Germany, April 1997 (hereinafter the "Stiefelhagen system"). The Stiefelhagen system locates a human face in an image using a statistical color model. The input image is searched for pixels with face colors, and the largest connected region of face-colored pixels in the image is considered as the region of the face. The color distribution is initialized so as to find a variety of face colors and is gradually adapted to the face actually found. The system then finds and tracks facial features, such as eyes, nostrils and lip-corners automatically within the facial region. Feature correspondences between two successive frames for certain characteristics provide detectable points used to compute the 3D pose of the head.

After the face region, and within the face region, the mouth location has been detected by either of the above techniques, mouth motion detection circuit 360 determines whether the mouth of the person is in motion. Several techniques are known in the art for tracking the expression of the lips, and many of these techniques are suitable for the present invention. One such technique is described in detail by L. Zhang in "Estimation of the Mouth Features Using Deformable Templates," Proc. IEEE International Conference on Image Processing ICIP-97, Santa Barbara, Calif., October 1997 (hereinafter the "Zhang technique"). The Zhang technique estimates mouth features automatically using deformable templates. The mouth shape is represented by the corner points of the mouth as well as lip outline parameters. The lip outline parameters describe the opening of the mouth and the thickness of the lips. An algorithm for automatic determination of whether the mouth is open or closed is part of the Zhang technique. The mouth features estimated and tracked can easily be converted into a mouth motion energy signal 326 to be passed on to the double-talk detector 318. If the mouth is detected as closed, the mouth motion energy is set to zero. Otherwise, the Mahalanobis distance of the mouth feature parameters from one frame to the next is used as the mouth motion energy. Methods to compute the Mahalanobis distance are known to those skilled in the art.

In an alternative embodiment, the mouth motion energy is determined without detecting and tracking mouth features. In this technique, motion compensation is carried out for a rectangular block around the previously detected mouth region. This motion compensation uses only one displacement vector with a horizontal and a vertical component for the entire block. The displacement vector is determined by block matching, i.e., the position of the block is shifted relative to the previous frame to minimize a cost function that captures the dissimilarity between the block in the current frame and its corresponding shifted version in the previous frame. Mean squared displaced frame difference (DFD) is a suitable cost function to capture the dissimilarity between the block in the current frame and its shifted version in the previous frame. Once the minimum of the mean squared DFD has been found, this minimum value is used directly as mouth motion energy. If the mouth is not moving, the motion of the mouth region can be described well by a single displacement vector, and the minimum mean squared DFD is usually small. However, if the mouth is moving, significant additional frame-to-frame changes in the luminance pattern occur that give rise to a larger minimum mean squared DFD after motion compensation with a single displacement vector. Compared to the first embodiment described for mouth motion detection, this second embodiment is both computationally less demanding and more robust, since problems with the potentially unreliable feature estimation stage (for example, when illumination conditions are poor) are avoided.

The mouth motion energy signal 326 derived from the near-end video is used by the double-talk detector to improve the reliability of detecting near-end silence. The combination of audio and video information in the double-talk detector is described in the following paragraphs. First described is an audio-only double-talk detector that does not make use of the video information.

The audio double-talk detector attempts to estimate the short-term energy, $E\_near$, of the near-end speech signal by comparing the short-term energy, $E\_receive$, of the received audio signal 344 and the short-term energy, $E\_transmit$, of the transmit audio signal 342. The near-end energy is estimated as:

$$E\_near = E\_transmit - E\_receive / ERLE$$

Specifically, the observed transmit audio signal energy is reduced by a portion of the energy due to the received audio energy fed back from the loudspeaker to the microphone. ERLE is the Echo Return Loss Enhancement, which captures the efficiency of the echo canceler and is estimated by calculating the sliding maximum of the ratio $$R = E\_receive/E\_transmit$$

If no interfering near-end speech is present, R will be precisely the current ERLE. However, with interfering near-end speech, R is lower. The sliding maximum is applied for each measurement window (usually every 30 msec), and replaces the current ERLE with R, if R is larger than the current ERLE. If R is not larger than the current ERLE, the current ERLE is reduced by:

$$ERLE\_new = d * ERLE\_old$$

The decay factor is optimized for best subjective performance of the overall system. Typically, a value d=0.98 for 30 msec frames is appropriate. For audio-only double-talk detection, the near-end energy, E_near, is compared to a threshold. If E_near exceeds the threshold, the double-talk detector 318 prevents the adaptation of filter 314 by signaling step-size SS=0 to adapter 316.

For video-assisted double-talk detection, the estimated near-end energy, E_near, is combined with the mouth motion energy, E_motion, to calculate the probability of near-end silence P(silence|E_near, E_motion). This is accomplished by calculating, according to the Bayes' Rule:

P(silence|E_near, E_motion)=
P(E_near|silence)*P(E_motion|silence)*
P(silence)/(P(E_near)*P(E_motion)) P(E_near|silence) is the probability of observing the particular value of E_near in the case of near-end silence. These values are measured by a histogram technique prior to the operation of the system and stored in a look-up table. P(silence) is the probability of near-end silence and is usually set to ½. P(E_near) is the probability of observing the particular value of E_near under all operating conditions, i.e., both with near-end silence AND near-end speech. These values are also measured by a histogram technique prior to the operation of the system and stored in a look-up table. In the same way, P(E_motion|silence) and P(E_motion) are measured prior to operation of the system and stored in additional look-up tables. In a refined version of the double-talk detector, the tables for P(E_near|silence) and P(E_near) are replaced by multiple tables for different levels of the estimated values of ERLE. In this way, the different reliability levels for estimating E_near in different states of convergence of filter 314 can be taken into account. The resulting probability P(silence|E_near, E_motion) is finally compared to a threshold to decide whether the condition of near-end silence is fulfilled that would allow a reliable, fast adaptation of the filter 314 by adapter 316. In addition, the double-talk detector compares the short-term received audio energy E_receive with another threshold to determine whether there is enough energy for reliable adaptation. If both thresholds are exceeded, an adaptation with a non-zero step-size by adapter 316 is enabled; otherwise the step-size is set to zero.

In another embodiment, as shown in FIG. 4, a second motion detection arrangement 332 can be structured in a manner similar to the first motion detection arrangement 330. The motion detection arrangement 332 is coupled to receive video signals on line 362 via video codec 364. Video signals received on line 362 are, for example, from a remote videoconferencing terminal and provided for local presentation on video display 366. Motion detection arrangement 332 detects, for example, mouth movement of a videoconference participant at the remote videoconferencing terminal. The remote motion detection signal from motion detection arrangement 332 is provided to adapter 316 on line 328. For double-talk detection that is assisted both by near-end video and far-end video, the estimated near-end audio energy, E_near, is combined with the near-end mouth motion energy, E_m1, and the far-end mouth motion energy, E_m2, to calculate the probability of near-end silence P(silence|E_near, E_m1, E_m2). The double-talk detector 318 contains a Bayes estimator that calculates:

$$P(\text{silence} | E\_near, E\_m1, E\_m2) =$$

$$\frac{P(E\_near | \text{silence}) * P(E\_m1 | \text{silence}) * E(E\_m2 | \text{silence}) * P(\text{silence})}{P(E\_near) * P(E\_m1) * P(E\_m2)}$$

As described above for P(E_motion|silence) and P(E_motion), P(E_m1|silence), P(E_m2|silence), P(E_m1) and P(E_m2) are measured prior to operation of the system and stored in look-up tables.

In another particular example embodiment, detected mouth movement can be used to control the selection of audio input where there are more than two terminals involved in a video conference. For example, if there are a plurality of video cameras at a plurality of locations, a central controller can select audio from the location at which mouth movement is detected, thereby permitting elimination of background noise from sites where the desired person is not speaking.

In yet another embodiment, the absence of detected mouth movement can be used to advantageously increase the video quality. For example, the hearing impaired may use videoconferencing arrangements for communicating with sign language. Because sign language uses hand movement instead of sound, the channel devoted to audio may instead be used to increase the video frame rate, thereby enhancing the quality of sign language transmitted via videoconferencing. Thus, if no mouth movement is detected, the system may automatically make the necessary adjustments. A related patent is U.S. Pat. No. 6,404,776 issued on Jun. 11, 2002, entitled "Data Processor Having Controlled Scalable Input Data Source and Method Thereof," docket number 8X8S.15USI1, which is hereby incorporated by reference. Other embodiments are contemplated as set forth in co-pending U.S. Pat. No. 6,124,882 issued on Sep. 26, 2000, entitled "Videocommunicating Apparatus and Method Therefor" by Voois et al., as well as various video communicating circuit arrangements and products, and their documentation, that are available from 8×8, Inc., of Santa Clara, Calif., all or which are hereby incorporated by reference.

The present invention has been described with reference to particular embodiments. These embodiments are only examples of the invention's application and should not be taken as limiting. Various adaptations and combinations of features of the embodiments disclosed are within the scope of the present invention as defined by the following claims.

What is claimed is:

1. A circuit arrangement for controlling audio signal transmissions for a communications system that includes a microphone and a video camera, comprising:

a video processor configured and arranged to receive a video signal from the video camera, detect movement of an object in the video signal, provide a motion-indicating signal indicating movement relative to the object; and an audio processor coupled to the video processor and configured and arranged to modify and mute the audio signal to be transmitted responsive to the motion-indicating signal.

2. The circuit arrangement of claim 1, wherein the object is a person.

3. The circuit arrangement of claim 1, wherein the object is a person's face.

4. The circuit arrangement of claim 1, wherein the object is a person's mouth.

5. An echo-cancellation arrangement for a video communication system that includes a microphone, a speaker, and a video camera for use by a video conference participant at a first location, comprising:

a video signal processor configured and arranged to receive a video signal from the video camera, detect mouth movement of the participant and provide a mouth-movement signal indicative of movement of the participant's mouth;

an echo-cancellation circuit coupled to the video signal processor and configured and arranged to filter from an audio signal provided by the microphone sound energy output by the speaker responsive to the mouth-movement signal.

6. The arrangement of claim 5, wherein the video signal processor includes:

a background detector configured and arranged to distinguish a foreground portion of an image from a background portion of the image;

a face detector coupled to the background detector and configured and arranged to detect an image of the participant's face in the foreground portion and detect movement of the participant's face; and a mouth-movement detector coupled to the face detector and configured and arranged to detect mouth movement in the image of the face and provide the mouth-movement signal.

7. The arrangement of claim 5, wherein the echo-cancellation circuit includes:

a double-talk detector configured and arranged to detect and generate a double-talk signal in response to a received audio signal and a transmit audio signal;

a coefficient adapter coupled to the double-talk detector and to the video signal processor and configured and arranged to generate filter coefficients responsive to the double-talk and mouth-movement signals; and a filter coupled to the adaptive processor.

8. A video communication arrangement with video-assisted echo-cancellation, the arrangement for use by a video conference participant at a first location, comprising:

a microphone;

a speaker;

a video camera arranged to provide a video signal;

a video signal processor coupled to the video camera and configured and arranged to detect mouth movement of the participant in the video signal and provide a mouth-movement signal indicative of the participant speaking;

an echo-cancellation circuit coupled to the microphone, speaker, and video signal processor and configured and arranged to filter, responsive to the mouth-movement signal, from an audio signal provided by the microphone sound energy output by the speaker;

a video display device;

a channel interface;

a multiplexer coupled to the channel interface, the echo-cancellation circuit, and the video signal processor, and configured and arranged to provide audio and video signals as output to the channel interface; and a demultiplexer coupled to the channel interface, the echo-cancellation circuit, the video display device, and the speaker, and configured and arranged to provide audio and video signals.

9. The arrangement of claim 8, wherein the video signal processor includes:

a background detector configured and arranged to distinguish a foreground portion of an image from a background portion of the image;

a face detector coupled to the background detector and configured and arranged to detect an image of the participant's face in the foreground portion and detect movement of the participant's face; and a mouth-movement detector coupled to the face detector and configured and arranged to detect mouth movement in the image of the face and provide the mouth-movement signal.

10. The arrangement of claim 9, wherein the echo-cancellation circuit includes:

a double-talk detector configured and arranged to detect and generate a double-talk signal in response to a received audio signal and a transmit audio signal;

a coefficient adapter coupled to the double-talk detector and to the video signal processor and configured and arranged to generate filter coefficients responsive to the double-talk and mouth-movement signals; and a filter coupled to the adaptive processor.

11. The arrangement of claim 8, wherein the echo-cancellation circuit includes:

a double-talk detector configured and arranged to detect and generate a double-talk signal in response to a received audio signal and a transmit audio signal;

a coefficient adapter coupled to the double-talk detector and to the video signal processor and configured and arranged to generate filter coefficients responsive to the double-talk and mouth-movement signals; and a filter coupled to the adaptive processor.

12. A method for audio signal and video signal processing, comprising:

receiving a video signal from a video camera;

receiving an audio signal from a microphone;

detecting movement of an object in the video signal;

providing a motion-indicating signal to an audio signal processor when movement of the object is detected;

modifying the audio signal in response to the motion-indicating signal; and providing a muted audio signal when no motion is detected.

13. The method of claim 12, wherein the object is a person.

14. The method of claim 12, wherein the object is a person's face.

15. The method of claim 12, wherein the object is a person's mouth.

16. A method for audio signal and video signal processing, comprising:

receiving a video signal from a video camera;

receiving an audio signal from a microphone;

detecting movement of a person's mouth in the video signal;

providing a motion-indicating signal to an echo-cancellation circuit when movement is detected; and modifying filter coefficients in response to the motion-indicating signal.

17. The method of claim 16, further comprising:

detecting a foreground portion of an image in the video signal;

detecting a face in the foreground portion of the image; and detecting a mouth on the face.

18. An apparatus for audio signal and video signal processing, comprising:

means for receiving a video signal from a video camera;

means for receiving an audio signal from a microphone;

means for detecting movement of a person's mouth in the video signal;

means for providing a motion-indicating signal to an echo-cancellation circuit when movement is detected; and means for modifying filter coefficients in response to the motion-indicating signal.

* * * * *

UNITED STATES PATENT AND TRADEMARK OFFICE
CERTIFICATE OF CORRECTION

PATENT NO.    : 6,483,532 B1
DATED         : November 19, 2002
INVENTOR(S)   : Girod It is certified that error appears in the above-identified patent and that said Letters Patent is hereby corrected as shown below:

Column 4,
Line 3, "5,594,8813" should read -- 5,594,813 --.

Signed and Sealed this

Second Day of December, 2003

JAMES E. ROGAN
*Director of the United States Patent and Trademark Office*